United States Patent [19]

Matysek et al.

[11] Patent Number: 4,926,220

[45] Date of Patent: May 15, 1990

[54] DUAL MODE SET DELIVERY APPARATUS

[75] Inventors: James F. Matysek, Fairport; Charles E. Smith, Pittsford, both of N.Y.

[73] Assignee: Xerox Corporation, Stamford, Conn.

[21] Appl. No.: 258,942

[22] Filed: Oct. 17, 1988

[51] Int. Cl.[5] .............................................. G03B 15/00

[52] U.S. Cl. .................................. 355/313; 414/789.9

[58] Field of Search ................ 355/313, 314, 321-325; 414/789.9; 270/52, 53, 58; 271/9, 278

[56] References Cited

U.S. PATENT DOCUMENTS

| | | | |
|---|---|---|---|
| 4,134,672 | 1/1979 | Barlew et al. | 355/14 |
| 4,411,515 | 10/1983 | Kukucka et al. | 355/3 SH |
| 4,424,963 | 1/1984 | Bartholet | 270/53 |
| 4,523,502 | 6/1985 | Besemann | 414/789.9 X |
| 4,782,363 | 11/1988 | Britt et al. | 355/321 |

*Primary Examiner*—Joan H. Pendegrass
*Attorney, Agent, or Firm*—H. Fleischer; J. E. Beck; R. Zibelli

[57] ABSTRACT

A dual mode apparatus in which set of sheets are delivered to an operator. The operating mode of the apparatus is selected, and sets of sheets are received and supported at a loading station. In response to the selected mode of operation, sets of sheets are advanced from the loading station to the unloading station for delivery to the operator. In one mode of operation, the sets of sheets are advanced from the loading station to the unloading station after the completion of each job. In another mode of operation, the sets of sheets are advanced from the loading station to the unloading station after the maximum number of sets of sheets have been stacked at the loading station independent of the number of jobs.

12 Claims, 4 Drawing Sheets

DUAL MODE SET DELIVERY APPARATUS

This invention relates generally to an electrophotographic printing machine, and more particularly concerns an apparatus for delivering sets of finished copy sheets to an operator.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet. The copy sheets are collected into unfinished sets of copy sheets. The collected copy sheets may then be bound or stapled together into finished sets of copy sheets. Finished or unfinished sets of copy sheets are then stacked for presentation to the machine operator.

In a high speed commercial printing machine of the foregoing type, large volumes of finished or unfinished sets of copy sheets are fed onto a stacking tray. When the tray is loaded to its capacity, an elevator moves the tray to a station where the operator can readily remove the finished or unfinished sets of copy sheets. Hereinbefore, the sets of copy sheets have always been delivered to the machine operator at the end of each job. Since the delivery of sets of copy sheets to the operator is a time consuming operation, this effectively reduces the productivity of the printing machine when several short jobs are run consecutively. Also, when several short jobs are being run, the operator is required to unload the sets of copy sheets several times. This reduces the productivity time of the printing machine and increases operator/machine interface time. Clearly, it is desirable to adjust delivery of the sets of copy sheets to the operator so as to increase machine productivity while reducing the operator/machine interface time.

Various approaches have been devised for stacking and unloading copy sheets. The following disclosures appear to be relevant:

U.S. Pat. No. 4,134,672
Patentee: Burlew et al.
Issued: Jan. 16, 1979

U.S. Pat. No. 4,411,515
Patentee: Kukucka et al.
Issued Oct. 25, 1983

U.S. Pat. No. 4,424,963
Patentee: Bartholet et al.
Issued: Jan. 10, 1984

Co-pending U.S. patent application Ser. No. 76,979
Applicant: Sadwick et al.
Filed: Jul. 23, 1987

The relevant portions of the foregoing patents may be summarized as follows:

U.S. Pat. No. 4,134,672 discloses a tray for receiving booklets of copy sheets. The booklets are stapled and stacked in the tray for delivery to the operator.

U.S. Pat. No. 4,411,515 describes a finisher having a sorter with a plurality of bins. Copy sheets are advanced into the bins to form completed sets. The sets of copy sheets may be stapled and are transported onto an elevator. The elevator collects the stapled or unstapled sets of copy sheets into piles for delivery to the operator by way of a conveyor.

U.S. Pat. No. 4,424,963 discloses a finisher in which sheets are received in an accumulator. When a predetermined number of sheets are accumulated, the stapler drives a staple through the stack of copy sheets and the stack is ejected from the accumulator and stapler onto an output tray. The tray moves vertically to compensate for stack height and oscillates to offset the stack.

Co-pending U.S. patent application Ser. No. 76,979 describes a sheet stacker having an elevator movably supporting a drawer having a tray. The tray receives successive sheets at a loading station. The elevator moves continuously downwardly to maintain the uppermost sheet of the stack of sheets on the tray at a preselected location in the loading station until the drawer and tray are positioned at a discharge station located interiorly of the housing. The sheets are transferred from the tray to the drawer which advances the sheets from the discharge station to an unloading station located externally of the housing. A door opens, in synchronism with the movement of the drawer, to enable the sheets to pass from the discharge station to the unloading station.

In accordance with one aspect of the present invention, there is provided a dual mode apparatus for delivering sets of sheets to an operator. Means are provided for selecting the mode of operation of the apparatus. Means receive and support the sets of sheets at a loading station. Means, responsive to said selecting means, advance the sets of sheets from the loading station to an unloading station for delivery to the operator. In one mode, the advancing means moves the sets of sheets from the loading station to the unloading station after the completion of each job. In another mode, the advancing means moves the sets of sheets from the loading station to the unloading station after the maximum number of sets of sheets have been stacked at the loading station independent of the number of jobs.

Pursuant to another aspect of the features of the present invention, there is provided an electrophotographic printing machine of the type in which successive sets of copy sheets having indicia recorded thereon are advanced to a finishing station for finishing and delivery to the printing machine operator. Means are provided for selecting the mode of operation of the finishing station. Means receive and support sets of finished and unfinished copy sheets at a loading station in the finishing station. Means, responsive to said selecting means, advance the sets of copy sheets from the loading station to an unloading station for delivery to the operator. In one mode, the advancing means moves the sets of copy sheets from the loading station to the unloading station after the completion of each job. In another mode, the advancing means moves the sets of copy sheets from the loading station to the unloading station after the maximum number of sets of sheets have been stacked at the loading station independent of the number of jobs.

Still another aspect of the present invention is a method of delivering sets of copy sheets to an operator at a finishing station. The method of delivery includes the step of selecting the mode of operation of the finishing station. Sets of finished and unfinished copy sheets are received and supported at a loading station in the finishing station. The sets of copy sheets are advanced from the loading station to an unloading station for delivery to the operator. In one mode, the sets of copy sheets are moved from the loading station to the unloading station after the completion of each job. In another mode, the sets of copy sheets are moved from the loading station to the unloading station after the maximum number of sets of sheets have been stacked at the loading station independent of the number of jobs.

Other aspects of the present invention will become apparent as the following description proceeds and upon reference to the drawings, in which.

While the present invention will hereinafter be described in connection with a preferred embodiment and method of use thereof, it will be understood that it is not intended to limit the invention to that embodiment and method of use. On the contrary, it is intended to cover all alternatives, modifications, and equivalents, as may be included within the spirit and scope of the invention as defined by the appended claims.

Figure 1:
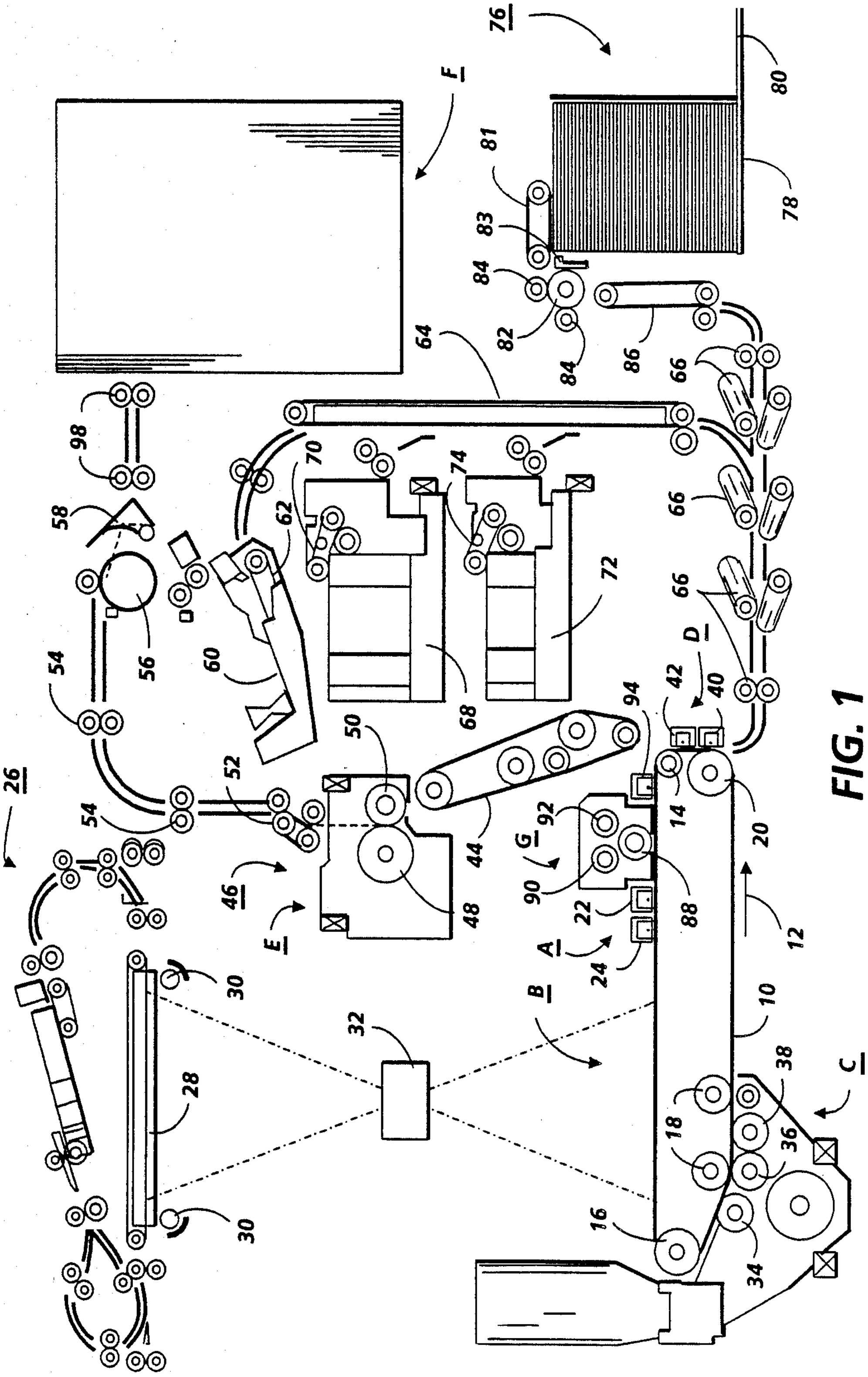
FIG. 1 is a schematic elevational view depicting an illustrative electrophotographic printing machine incorporating a finisher having the set delivery apparatus of the present invention therein.

For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the sheet delivery apparatus of the present invention may be employed in a wide variety of devices and is not specifically limited in its application to the particular embodiment or method of use depicted herein.

Referring to FIG. 1 of the drawings, the electrophotographic printing machine employs a photoconductive belt 10. Preferably, the photoconductive belt 10 is made from a photoconductive material coated on a ground layer, which, in turn, is coated on a anti-curl backing layer. The photoconductive material is made from a transport layer coated on a generator layer. The transport layer transports positive charges from the generator layer. The interface layer is coated on the ground layer. The transport layer contains small molecules of di-m-tolydiphenylbiphenyldiamine dispersed in a polycarbonate. The generation layer is made from trigonal selenium. The grounding layer is made from a titanium coated Mylar. The ground layer is very thin and allows light to pass therethrough. Other suitable photoconductive materials, ground layers, and anti-curl backing layers may also be employed. Belt 10 moves in the direction of arrow 12 to advance successive portions of the photoconductive surface sequentially through the various processing stations disposed about the path of movement thereof. Belt 10 is entrained about stripping roller 14, tensioning roller 16, idler rollers 18, and drive roller 20. Stripping roller 14 and idler rollers 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating devices, indicated generally by the reference numerals 22 and 24, charge the photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of the photoconductive surface is advanced through imaging station B. At imaging station B, a document handling unit, indicated generally by the reference numeral 26, is positioned over platen 28 of the printing machine. Document handling unit 26 sequentially feeds documents from a stack of documents placed by the operator face up in a normal forward collated order in the document stacking and holding tray. A document feeder located below the tray forwards the bottom document in the stack to a pair of take-away rollers. The bottom sheet is then fed by the rollers through a document guide to a feed roll pair and belt. The belt advances the document to platen 28. After imaging, the original document is fed from platen 28 by the belt into a guide and feed roll pair. The document then advances into an inverter mechanism and back to the document stack through the feed roll pair. A position gate is provided to divert the document to the inverter or to the feed roll pair. Imaging of a document is achieved by lamps 30 which illuminate the document on platen 28. Light rays reflected from the document are transmitted through lens 32. Lens 32 focuses light images of the original document onto the charged portion of photoconductive belt 10 to selectively dissipate the charge thereon. This records an electrostatic latent image on the photoconductive belt which corresponds to the informational areas contained within the original document. Thereafter, belt 10 advances the electrostatic latent image recorded thereon to development station C.

Development station C has three magnetic brush developer rolls, indicated generally by the reference numerals 34, 36 and 38. A paddle wheel picks up developer material and delivers it to the developer rolls. When developer material reaches rolls 34 and 36, it is magnetically split between the rolls with half the developer material being delivered to each roll. Photoconductive belt 10 is partially wrapped about rolls 34 and 36 to form extended development zones. Developer roll 38 is a cleanup roll. A magnetic roll, positioned after developer roll 38, in the direction of arrow 12, is a carrier granule removal device adapted to remove any carrier granules adhering to belt 10. Thus, rolls 34 and 36 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pre-transfer light from a lamp (not shown) to reduce the attraction between photoconductive belt 10 and the toner powder image. Next, a corona generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly, indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station F or to duplex tray 60. At finishing station F, copy sheets are stacked in complier trays to form sets of copy sheets. The sets of copy sheets may remain unfinished or may be finished by being attached to one another. The sheets of each set are attached to one another by either a binding device or a stapling device. In either case, a plurality of finished or unfinished sets of copy sheets are formed in finishing station F. The sets of copy sheets are delivered to the operator either at the end of each of the selected jobs or when the stacker has been filled. A job is intended to mean the formation of one or a plurality of copies from the same set of original documents. The set of copies may be finished or unfinished. A finished set is bound by either staples or binding tape. The details of finishing station F will be described hereinafter with reference to FIGS. 2 through 4, inclusive. When duplex solenoid gate 58 diverts the sheet into duplex tray 60. Duplex tray 60 provides an intermediate or buffer storage for those sheets that have been printed on one side and on which an image will be subsequently printed on the second, opposed side thereof, i.e. the sheets being duplexed. The sheets are stacked in duplex tray 60 face down on top of one another in the order in which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are fed to transfer station D from the secondary tray 68. The secondary tray 68 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 70. Sheet feeder 70 is a friction retard feeder utilizing a feed belt and take-away rolls to advance successive copy sheets to transport 64 which advances the sheets to rolls 66 and then to transfer station D.

Copy sheets may also be fed to transfer station D from the auxiliary tray 72. The auxiliary tray 72 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 74. Sheet feeder 74 is a friction retard feeder utilizing a feed belt and take-away rolls to advance successive copy sheets to transport 64 which advances the sheets to rolls 66 and then to transfer station D.

Secondary tray 68 and auxiliary tray 72 are secondary sources of copy sheets. A high capacity feeder, indicated generally by the reference numeral 76, is the primary source of copy sheets. High capacity feeder 76 includes a tray 78 supported on an elevator 80. The elevator is driven by a bidirectional AC motor to move the tray up or down. In the up position, the copy sheets are advanced from the tray to transfer station D. A fluffer and air knife 83 direct air onto the stack of copy sheets on tray 78 to separate the uppermost sheet from the stack of copy sheets. A vacuum pulls the uppermost sheet against feed belt 81. Feed belt 81 feeds successive uppermost sheets from the stack to an take-away drive roll 82 and idler rolls 84. The drive roll and idler rolls guide the sheet onto transport 86. Transport 86 advances the sheet to rolls 66 which, in turn, move the sheet to transfer station station D.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls 90 and 92, i.e. waste and reclaim de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the rear of cleaning station G.

The various machine functions are regulated by a controller. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the documents and the copy sheets. In addition, the controller regulates the various positions of the gates depending upon the mode of operation selected.

Figure 2:
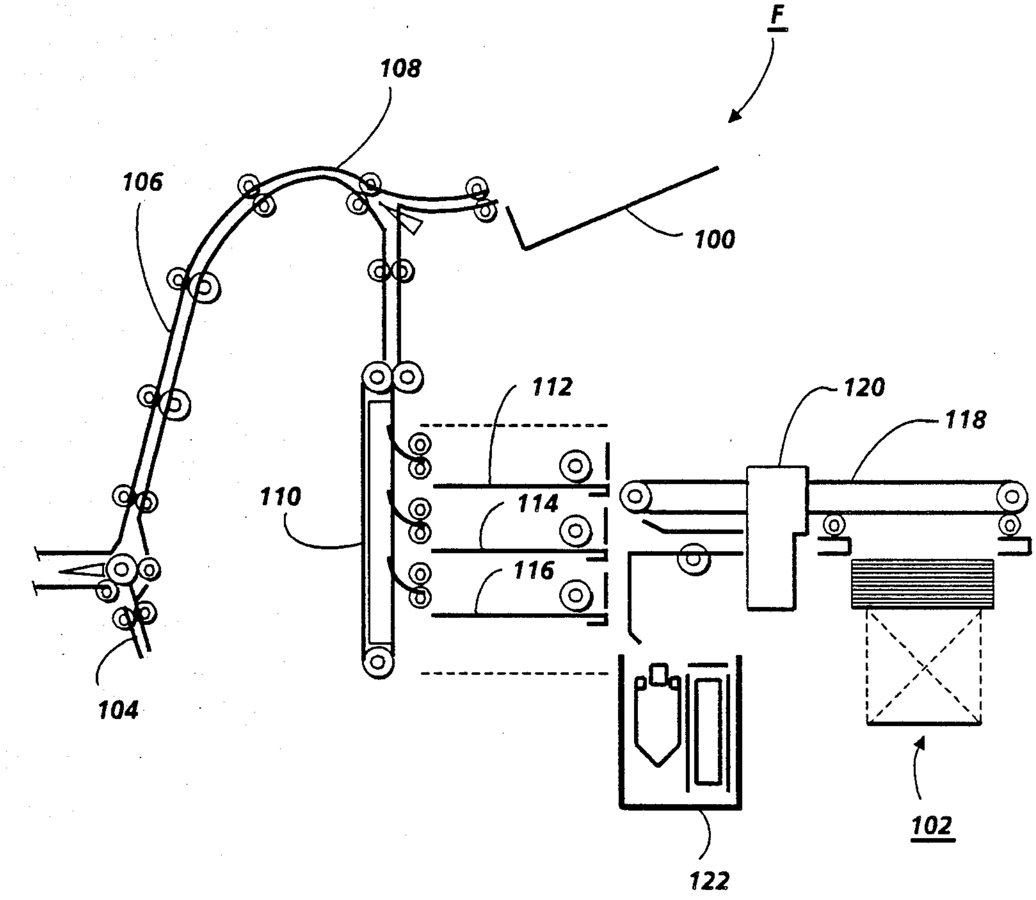
FIG. 2 is a schematic elevational view showing the finishing station of the FIG. 1 printing machine.

Referring now to FIG. 2, the general operation of finishing station F will now be described. Finishing station F receives fused copies from rolls 98 (FIG. 1) and delivers them to the top tray 100 or to the sheet delivery apparatus of the present invention, indicated generally by the reference numeral 102. The details of sheet delivery apparatus 102 will be described hereinafter with reference to FIGS. 3 and 4. Sets of copy sheets delivered to sheet delivery apparatus 102 may be either collated or uncollated, and finished or unfinished. Unfinished sets may be offset, and finished sets stapled with one or two staples. Finishing station F can also bind sets and deliver stacks of bound sets to delivery apparatus 102. The sheet path of finishing station F has an inverter 104 driven by a reversible AC motor. The inverter has a solenoid actuated diverter gate that diverts sheets into the inverter, and a tri-roll nip that is used to drive sheets into and out of the inverter. Registration transport 106 is used to transport sheets from inverter 104 to output transport 108. Two cross roll registration nips are used to register the sheets. The cross roll registration nips are driven by the sheet path drive motor. The output transport 108 is driven by the sheet path drive motor. It transports sheets from the registration transport to the top tray gate where the sheets are diverted to either vacuum transport 110 or into top tray 100. Vacuum transport 110 is used to transport sheets from transport 108 to any one of three bins 112, 114 or 116. Bins 112, 114, and 116 are used to compile and register sheets into sets. The bins are driven up or down by a bidirectional AC bin drive motor adapted to position the proper bin at the unloading position. A set transport 118 has a pair of set clamps mounted on two air cylinders and driven by four air valve solenoids. Two of the air valves are used for positioning the set transport and two are used for the retract function. The set transport is used to transport sets from the bins to the stitcher 120, binder 122 and sheet delivery apparatus 102. The stitched, bound, or unfinished sets are delivered to sheet delivery apparatus 102 where they are stacked for delivery to the operator.

Figure 3:
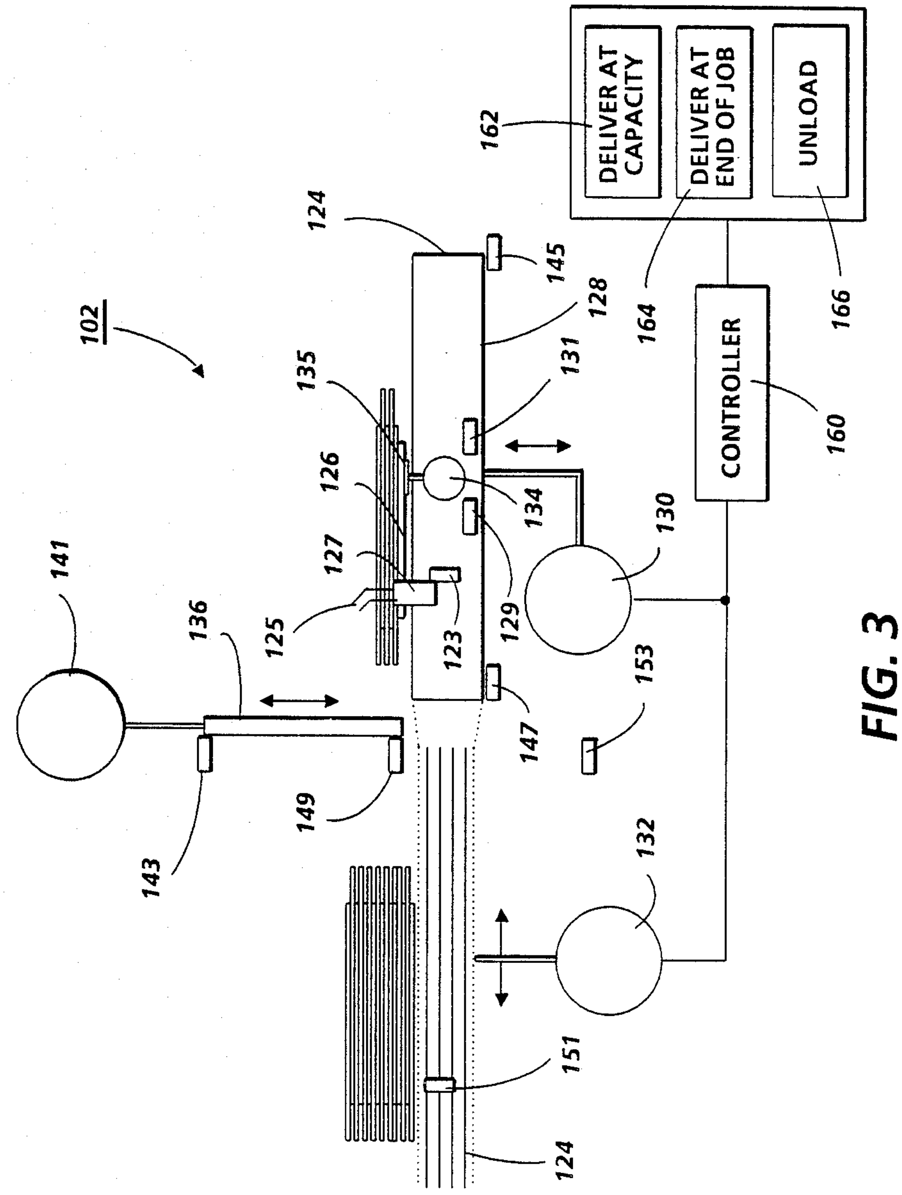
FIG. 3 is a schematic elevational view illustrating the set delivery apparatus of the FIG. 2 finishing station.

Turning now to FIG. 3, there is shown a schematic illustration of sheet delivery apparatus 102. Delivery apparatus 102 has a stack delivery drawer 124 and a stack offset tray 126 both of which are mounted on a platform elevator 128 that is driven by a bi-directional AC motor 130. The stack delivery drawer 124 is driven in and out of the printing machine by a bi-directional AC motor 132. During loading, motor 130 moves elevator 128 upwardly to position tray 126 and drawer 124 at the loading station. Tray 126 is raised so that the tray surface is slightly above the surface of drawer 124. The stacker offset tray 126 is moved to its' two offset positions by a bi-directional AC motor 134 coupled to a surface cam 135. Cam 135 has a groove that a pin attached to the lower portion of tray 126 follows when motor 134 rotates cam 135. This groove translates the motor rotational movement into forward or reverse movement depending upon the direction that motor 134 is commanded to rotate. Guide pins in slots on the lower portion of tray 126 allow forward or reverse movement of the tray while maintaining the tray position on drawer 124. Switches 129 and 131 located on the top of the elevator at the front and rear of tray 126, when actuated, signal to the controller that the tray is in the forward or reverse position. The controller, in turn, signals to stop forward or reverse movement. In this way, while sets are being loaded onto the tray, the tray alternately offsets the sets about 24 millimeters, and the elevator motor indexes the tray and drawer downwardly to maintain proper stack height. A stack bale 125 mounted on the rear of the set transport carriage above tray 126 moves down after each set of copy sheets is loaded on tray 126 to press each newly loaded set of copy sheets down to yield maximum set capacity. An air valve and solenoid 127 move bale 125 using air pressure.

Timing and duration is controlled by the controller 160 of the printing machine. Depending upon the mode selected, i.e. deliver after each job or delivery after the maximum number of sets of copy sheets have been loaded on tray 126, elevator 128 is moved downwardly by motor 130 to the discharge station. The mode of operation is determined by the operator energizing either key 162 or 164. Energization of key 162 transmits a command to controller 160 indicating that the sets of copy sheets should be delivered to the operator when the maximum number of sets has been stacked on tray 126, independent of the number of jobs. Alternatively, energization of key 164 transmits a command to controller 160 that the sets of copy sheets should be delivered to the operator at the end of each job. In this mode of operation, only one job of copy sheets is loaded on tray 126 and the capacity of tray 126 need not be reached for the sets of copy sheets corresponding to the selected job to be unloaded to the operator. The type and number of jobs is selected by the operator by actuating the appropriate keys on the control panel which transmits the corresponding command to the controller. For example, the operator may select a combination of keys on the control panel to produce a sequence of jobs. The first job, corresponding to the first set of original documents, may have five sets of stapled copy sheets reproduced therefrom with the second job, corresponding to the second set of original documents, having eight sets of stapled copy sheets reproduced therefrom. In the event key 164 has been energized, the sets of copy sheets will be delivered after each job is completed. Thus, after the first job is completed, five sets of stapled copy sheets will be delivered to the operator and after the second job is completed eight sets of stapled copy sheets will be delivered to the operator. Alternatively, if key 162 has been energized, the sets of copy sheets will be delivered after the maximum number of sheets have been stacked on tray 126. Thus, if upon completion of jobs one and two stack, the maximum number of copy sheets are stacked on tray 126, jobs one and two will be delivered to the operator simultaneously, rather than sequentially. If, no other jobs have been programmed and the capacity of tray 126 has not been reached, jobs one and two will not be delivered to the operator unless the operator energizes key 166 which causes immediate delivery of the sets of copy sheets on tray 126. However, in the event additional jobs have been programmed and the capacity of tray 126 has not been reached, delivery of the sets of copy sheets corresponding to jobs one and two will be inhibited until the capacity of tray 126 is reached. When the unload at capacity option has been selected, i.e. key 164 has been energized, controller 160 will not allow unfinished sets of copy sheets to be stacked on top of finished sets of copy sheets because the finished edge buildup causes a slope on the top of the stack which may induce the unfinished sets of copy sheets to slide off the top of the stack. If there are finished sets of copy sheets on the tray and an unfinished job is started, the contents of the tray will be delivered to the operator prior to stacking any unfinished sets thereon. Controller 160 will automatically cause delivery of all of the finished sets of copy sheets corresponding to the various jobs stacked on tray 126 prior to stacking the unfinished sets of copy sheets thereon. For example, if a third job was programmed wherein the sets of copy sheets were unfinished and the operator has energized key 164, the first two jobs, corresponding to the finished sets of copy sheets, will be delivered to the operator and, thereafter, the third set of unfinished copy sheets will be stacked on the tray and subsequently delivered to the operator. In addition to inhibiting stacking unfinished sets of copy sheets on top of finished sets of copy sheets, the controller will inhibit stacking adhesively bound sets of copy sheets on top of stapled sets of copy sheets. The is done because single stapled sets of copy sheets will have a staple buildup on only one corner of the sets of copy sheets, and a adhesively bound set of copy sheets may tend to skew on the stack of copy sheets or wrinkle if stacked on top of a stack of stapled copy sheets. Thus, if the third job was programmed wherein the sets of copy sheets were adhesively bound and the operator has energized key 164, the first two jobs, corresponding to the stapled sets of copy sheets, will be delivered to the operator and, thereafter, the third set of adhesively bound copy sheets will be stacked on the tray and subsequently delivered to the operator. In the event it is necessary to immediately unload the set of copy sheets on the tray, the operator energizes key 166. Energization of key 166 causes whatever portion of a job that is currently on the tray to be delivered to the operator as soon as possible.

At the discharge station, tray 126 is lowered so that the upper tray surface is below the upper drawer surface. The up and down movement of tray 126 is controlled by cam 135. Cam 135 produces the up and down movement when motor 134 rotates. Rollers, attached to the tray, ride on the lobes of the cam. The high points of the lobes lift the tray up and the low points lower the tray allowing up and down movement of the tray while maintaining tray position. The cam lobes and the groove are placed in such a manner that the up and down movement and the forward and reverse movement occur at difference arc segments of the rotation of motor 134. As the cam rotates 75° counter clockwise, the tray moves forward. As the cam rotates clockwise 75° tray 126 reverses and returns. As the cam rotates counter clockwise 45° (from the initial 75° ), the upper surface of tray 126 drops lower than the upper surface of drawer 124 transferring the sets of copy sheets from the tray to the drawer. This occurs at the discharge station, where the sets of copy sheets are transferred from the tray to the drawer for delivery to an intermediate station. During the delivery cycle, the stack delivery drawer is driven out of the machine to an intermediate station, and as soon as the drawer is at the intermediate station external of the finishing station, the drawer and stacker tray are moved upwardly to return the tray to the loading station, and position the drawer at a convenient location for operator access, about 74 centimeters above the floor, for easier unloading of the sets of copy sheets therefrom at the unloading station. This action positions the tray at the loading station where it is ready to receive additional sets, and also positions the drawer with the stack of sheets thereon at the unloading station. A safety door 136, driven by a bi-directional AC motor 141, opens to permit the stack delivery drawer 124 to move from the discharge station to the intermediate station and then to the unloading station. FIG. 3 shows stack delivery drawer 124 to the left when it is at the intermediate station and to the right when it is located at the discharge station where the stack of sheets is being transferred from tray 126 to drawer 124. Door 136 is closed when drawer 124 is in the machine during delivery of sets of sheets to tray 126 when it is in the loading station. After the sets of sheets have been transferred to the stack delivery drawer at the discharge station, the door is driven up to allow the stack delivery drawer to deliver the stack of sets to the unloading station where the operator may remove the sets.

In operation, controller 160 regulates motor 130 to move elevator 128 having tray 126 and drawer 124 mounted thereon to its uppermost position at the loading station. At the loading station, sets of finished or unfinished sheets are advanced onto tray 126. A stack height sensor 123 comprising two sections placed at the front and rear of tray 126, above the tray. Each section has a light emitting diode and a photodetector. Each light emitting diode directs a light beam across the top of the tray so that if either light beam is blocked, the photodetector signals that a set of copy sheets is blocking the array. Between loading successive sets of copy sheets, the controller interrogates the sensor array state, if the sensor array state indicates a light beam is blocked by the stack, then the controller signals to motor 130 to turn on and drive elevator 124 down moving tray 126 down until the sensor array state changes to signal that the stack of copy sheets is clear of both light beams. The process continues so as to maintain the uppermost sheet on the tray at a fixed position for receiving successive sets. Motor 130 is located on the base of the finisher station frame towards the rear of the sheet stacker area. Motor 130 supplies rotational drive, via a drive belt and pulleys, to the lower end of two vertical lead screw. The lead screw passes through a nut affixed to the side of the elevator to move the elevator up or down. A stack hold position switch, located near the bottom elevator path of movement, is actuated when the elevator moves down. At this point, the controller is programmed, based on an internal program using look-up tables which consider such things as; set sheet count, sheet length, stitch or bind option selected, etc, to calculate the remaining number of sets to be placed on the tray to complete the selected job in the event key 164 has been energized, or until the capacity of the tray has been reached, i.e. key 162 has been energized. When the calculated set quantity is reached, a delivery cycle is initiated to deliver the completed stack of sets to the operator. At this time, motor 141 is energized to rotate a drive screw which moves door 136 upwardly. When door 136 is fully up, switch 136 is actuated. Switch 136 signals the controller that the path is now clear for drawer 124 to deliver the sets of copy sheets from the discharge station to the unloading station.

Tray 124 is made from several horizontal struts equally spaced from one another and defining a horizontal surface for supporting the sets of sheets of the stack. Drawer 126 is made from three horizontal struts equally spaced from one another and defining a horizontal stack support surface. The drawer struts extend along the tray spaces and the tray struts extend along the drawer spaces so that tray struts pass through the drawer spaces, i.e. tray struts are positioned within grooved cutouts in the drawer. As the tray struts lower, the upper surface of the tray struts descends beneath the upper surface of the drawer struts to transfer the stack of sets of sheets from the tray to the drawer. This occurs at the discharge station. A switch 131 located on elevator 124 is actuated when the tray is in the lowered position. When actuated, this switch signals to the controller that tray 126 is in the down position and switch 143 indicates that door 136 is in the up position. With door 136 in the up position, drawer 124 can pass through the opening with the stack of sets of sheets thereon. The controller, in turn, actuates motor 132 to move drawer 124 horizontally from the discharge station to the intermediate station. When drawer 124 with the stack of sets of sheets thereon is at the intermediate station, switch 145 is opened and switch 147 is closed. Motor 130 is now energized to move the elevator 128 upwardly to position tray 126 at the loading station and drawer 124 at the unloading station. Motor 141 is now energized to move door 136 downwardly to the top of drawer 124. Switch 149 is now energized indicating that the door is at the top of the drawer. The operator now removes the sets of copy sheets from drawer 124. After the sets of copy sheets have been removed from drawer 124, switch 151 is actuated signaling the controller that the sets of copy sheets have been removed. The controller than energizes motor 132 to move drawer 124 back to the loading station internal of the finishing station. This closes switch 145 and opens switch 147. The controller, in response to switch 147 being opened and switch 145 being closed, actuates motor 141 to move door 136 downwardly to the fully closed position actuating switch 153 and completing the cycle.

Elevator 128 includes two struts, one struts on each side thereof. The struts support drawer 124 horizontally and are mounted vertically slidable in the elevator frame. The ends of the struts are mounted on two drive screws connected by a drive belt and pulleys to motor 130. As motor 130 rotates in one direction, the elevator move from the discharge station to the loading station. When motor 130 reverses direction, the elevator moves from the loading station to the discharge station. Drawer 124 is mounted on slides on elevator 128. Motor 132 is mounted to the rear of the elevator. The drive train includes a belt a pulley mounted on motor 132 and a pulley mounted on elevator. The belt is clamped to the drawer. As the motor rotates, the belt translates the drawer from the discharge station to the intermediate station and from the unloading station to the loading station. Switch 147 is mounted under the drawer toward the front. The switch is actuated by a protruding ramp at the bottom rear of the drawer when the drawer is fully out at the intermediate station and the unloading station. The switch than signals the controller and the drive is stopped. Switch 145 is mounted under the drawer toward the rear. The switch is actuated by a ramp which is at the bottom front of the drawer. When the drawer is fully in, at the discharge station and loading station, switch 145 signals the controller and the drive is stopped. Sensor 151 is located under the front surface of the drawer. When copy sheets are laying on the drawer over the sensor, light from the sensor light emitting diode is reflected back to the sensor. At the completion of the drawer drive out cycle, the controller monitors the sensor state. When the operator removes the sets of copy sheets, the sensor no longer receives reflected light from the light emitting diode. The sensor state changes and the controller signals to drive the drawer from the intermediate station to the loading station.

Figure 4:
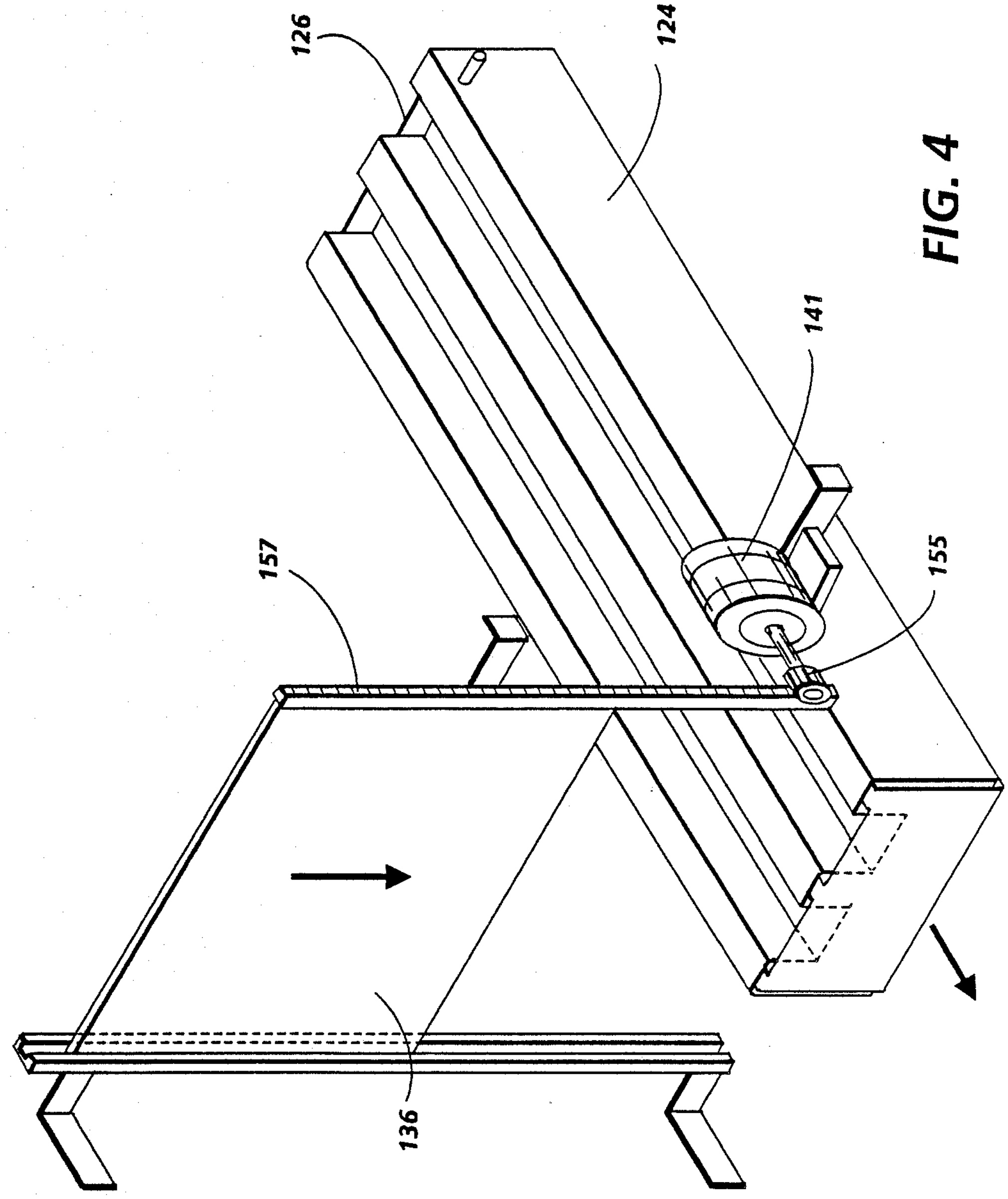
FIG. 4 is a perspective view depicting a portion of the FIG. 3 set delivery apparatus.

FIG. 4 shows the operation of the door 136. Door 136 is mounted vertically slidably in the cover of the finishing station of the printing machine. Both the loading station and the discharge station are located internally of the finishing station of the printing machine. The intermediate station and the unloading station are positioned externally of the finishing station of the printing machine. The upper surface of tray 126 has descended below the upper surface of drawer 124. Motor 141 is energized to rotate gear 155. Gear 155 meshes with rack 157. Rack 157 is mounted on door 136. As motor 141 rotates gear 155, rack 157 translates upwardly or downwardly moving door 136 therewith. In this way, door 136 opens enabling the sets of copy sheets transferred from tray 126 to drawer 124 to move therewith from the discharge station to the intermediate station, and then to the unloading station where the operator removes the sets of copy sheets therefrom.

In recapitulation, the dual mode sheet delivery apparatus of the present invention delivers sets of finished or unfinished copy sheets to the operator after each job has been completed or after the maximum number of sets of copy sheets have been stacked on the receiving tray. The mode of operation is operator selectable. When the unload at capacity only option has been selected, several jobs are accumulated on the tray before the entire stack of sets of copy sheets is delivered to the operator. When this option is selected, the contents of the tray are not delivered to the operator until the stack of sets of copy sheets reaches the physical capacity of the tray or until the operator presses the unload key to request immediate delivery. By compiling several jobs on the tray, the operator waiting time between jobs is reduced, and an operator can receive all of the output in one stack.

It is, therefore, evident that there has been provided, in accordance with the present invention, a sheet delivery apparatus that fully satisfies the aims and advantages hereinbefore set forth. While this invention has been described in conjunction with a preferred embodiment and method of use thereof, it is evident that many alternatives, modifications, and variations will be apparent to those skilled in the art. Accordingly, it is intended to embrace all such alternatives, modifications and variations as fall within the spirit and broad scope of the appended claims.

What is claimed is:

1. A dual mode apparatus for delivering sets of sheets to an operator, including:

means for selecting the mode of operation of the apparatus;

means for receiving and supporting the sets sheets at a loading station; and means, responsive to said selecting means, for advancing the sets of sheets from the loading station to an unloading station for delivery to the operator, said advancing means, in one mode, moving the sets of sheets from the loading station to the unloading station after the completion of each job and, in another mode, after the maximum number of sets of sheets have been stacked at the loading station independent of the number of jobs with all of the sets of sheets being either finished in the same manner or unfinished.

2. An apparatus according to claim 1, further including means for overriding the mode selected by said selecting means so that said advancing means advances the sets of sheets from the loading station to the unloading station upon actuation of said overriding means.

3. An apparatus according to claim 2, wherein said advancing means advances the sets of sheets from the loading station to the unloading station in response to unfinished sets of sheets being transported to the loading station when finished sets of sheets are disposed thereat.

4. A dual mode apparatus for delivering sets of sheets to an operator, including:

means for selecting the mode of operation of the apparatus;

means for receiving and supporting the sets sheets at a loading station;

means, responsive to said selecting means, for advancing the sets of sheets from the loading station to an unloading station for delivery to the operator, said advancing means, in one mode, moving the sets of sheets from the loading station to the unloading station after the completion of each job and, in another mode, after the maximum number of sets of sheets have been stacked at the loading station independent of the number of jobs, said advancing means advances the sets of sheets from the loading station to the unloading station in response to unfinished sets of sheets being transported to the loading station when finished sets of sheets are disposed thereat, said advancing means advances the sets of sheets from the loading station to the unloading station in response to sets of adhesively bound sheets being transported to the loading station when sets of stapled sheets are disposed thereat; and means for overriding the mode selected by said selecting means so that said advancing means advances the sets of sheets from the loading station to the unloading station upon actuation of said overriding means.

5. An electrophotographic printing machine of the type in which successive sets of copy sheets having indicia recorded thereon are advanced to a finishing station for finishing and delivery to the printing machine operator, wherein the improvement includes:

means for selecting the mode of operation of the finishing station;

means for receiving and supporting sets of finished and unfinished copy sheets at a loading station in the finishing station; and means, responsive to said selecting means, for advancing the sets of copy sheets from the loading station to an unloading station for delivery to the operator, said advancing means, in one mode, moving the sets of copy sheets from the loading station to the unloading station after the completion of each job and, in another mode, after the maximum number of sets of sheets have been stacked at the loading station independent of the number of jobs with all of the sets of sheets being either finished in the same manner or unfinished.

6. A printing machine according to claim 5, further including means for overriding the mode selected by said selecting means so that said advancing means advances the sets of copy sheets from the loading station to the unloading station upon actuation of said overriding means.

7. A printing machine according to claim 6, wherein said advancing means advances the sets of copy sheets from the loading station to the unloading station in response to unfinished sets of copy sheets being transported to the loading station when finished sets of sheets are disposed thereat.

8. An electrophotographic printing machine of the type in which successive sets of copy sheets having indicia recorded thereon are advanced to a finishing station for finishing and delivery to the printing machine operator, wherein the improvement includes:

means for selecting the mode of operation of the finishing station;

means for receiving and supporting sets of finished and unfinished copy sheets at a loading station in the finishing station; and means, responsive to said selecting means, for advancing the sets of copy sheets from the loading station to an unloading station for delivery to the operator, said advancing means, in one mode, moving the sets of copy sheets from the loading station to the unloading station after the completion of each job and, in another mode, after the maximum number of sets of sheets have been stacked at the loading station independent of the number of jobs, said advancing means advances the sets of copy sheets from the loading station to the unloading station in response to unfinished sets of copy sheets being transported to the loading station when finished sets of sheets are disposed thereat said advancing means advances the sets of copy sheets from the loading station to the unloading station in response to sets of adhesively bound copy sheets being transported to the loading station when sets of stapled sheets are disposed thereat; and means for overriding the mode selected by said selecting means so that said advancing means advances the sets of copy sheets from the loading station to the unloading station upon actuation of said overriding means.

9. A method of delivering sets of copy sheets to an operator at a finishing station, including the steps of:

selecting the mode of operation of the finishing station;

receiving and supporting sets of finished and unfinished copy sheets at a loading station in the finishing station; and advancing the sets of copy sheets from the loading station to an unloading station for delivery to the operator, said step of advancing means, in one mode, moving the sets of copy sheets from the loading station to the unloading station after the completion of each job and, in another mode, moving the sets of copy sheets from the loading station to the unloading station after the maximum number of sets of sheets have been stacked at the loading station independent of the number of jobs with all of the sets of sheets being either finished in the same manner or unfinished.

10. A method according to claim 9, further including the step of overriding the mode selected by said step of selecting so that the sets of copy sheets advance to the unloading station independent of the selected mode.

11. A method according to claim 10, wherein said step of advancing advances the sets of copy sheets from the loading station to the unloading station in response to unfinished sets of copy sheets being transported to the loading station when the loading station has received and is supporting sets of finished copy sheets thereat.

12. A method of delivering sets of copy sheets to an operator at a finishing station, including the steps of:

selecting the mode of operation of the finishing station;

receiving and supporting sets of finished and unfinished copy sheets at a loading station in the finishing station;

advancing the sets of copy sheets from the loading station to an unloading station for delivery to the operator, said step of advancing means, in one mode, moving the sets of copy sheets from the loading station to the unloading station after the completion of each job and, in another mode, moving the sets of copy sheets from the loading station to the unloading station after the maximum number of sets of sheets have been stacked at the loading station independent of the number of jobs, said step of advancing advances the sets of copy sheets from the loading station to the unloading station in response to unfinished sets of copy sheets being transported to the loading station when the loading station has received and is supporting sets of finished copy sheets thereat, said step of advancing advances the sets of copy sheets from the loading station to the unloading station in response to sets of adhesively bound copy sheets being transported to the loading station when the loading station has received and is supporting sets of stapled copy sheets thereat; and overriding the mode selected by said step of selecting so that the sets of copy sheets advance to the unloading station independent of the selected mode.

* * * * *